US012650032B2

(12) United States Patent
Kircher

(10) Patent No.: US 12,650,032 B2
(45) Date of Patent: Jun. 9, 2026

(54) LATCH MECHANISM FOR AN OVERHEAD STOWAGE COMPARTMENT

(71) Applicant: Airbus Operations GmbH, Hamburg (DE)

(72) Inventor: Benedikt Kircher, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 108 days.

(21) Appl. No.: 18/599,508

(22) Filed: Mar. 8, 2024

(65) Prior Publication Data

US 2024/0328207 A1 Oct. 3, 2024

(30) Foreign Application Priority Data

Mar. 29, 2023 (EP) ..................................... 23165179

(51) Int. Cl.
| | |
|---|---|
| *E05B 63/14* | (2006.01) |
| *B64D 11/00* | (2006.01) |
| *E05B 47/00* | (2006.01) |
| *E05B 65/00* | (2006.01) |
| *E05B 51/02* | (2006.01) |

(52) U.S. Cl.
CPC ............ *E05B 63/14* (2013.01); *B64D 11/003* (2013.01); *E05B 47/0002* (2013.01); *E05B 65/00* (2013.01); *E05B 51/02* (2013.01)

(58) Field of Classification Search
CPC ...... E05B 63/14; E05B 47/0002; E05B 65/00; E05B 51/02; B64D 11/003
See application file for complete search history.

(56) References Cited

U.S. PATENT DOCUMENTS

| | | | |
|---|---|---|---|
| 1,438,547 A | 12/1922 | O'Connor | |
| 8,096,152 B2 | 1/2012 | Wagh et al. | |
| 11,293,208 B2 | 4/2022 | Heimbach | |
| 11,643,840 B2 * | 5/2023 | Damneun ........... | E05B 15/0006 |
| | | | 292/2 |
| 2015/0360780 A1 * | 12/2015 | Kammerer ........... | B64D 11/003 |
| | | | 244/118.5 |
| 2017/0226781 A1 * | 8/2017 | Hernandez .......... | E05B 15/0006 |
| 2019/0017308 A1 * | 1/2019 | Chadwell ................ | E05D 7/081 |
| 2020/0370341 A1 * | 11/2020 | Lawrence ............... | E05B 5/006 |
| 2021/0040786 A1 * | 2/2021 | Heimbach ................. | B60R 7/04 |

(Continued)

FOREIGN PATENT DOCUMENTS

| | | |
|---|---|---|
| DE | 509732 C | 10/1930 |
| EP | 0411305 A1 | 2/1991 |
| EP | 3929083 A2 | 12/2021 |

OTHER PUBLICATIONS

European Search Report for corresponding European Patent Application No. 23165179.5 dated Aug. 25, 2023.

*Primary Examiner* — Mark A Williams
(74) *Attorney, Agent, or Firm* — Greer, Burns & Crain, Ltd.

(57) ABSTRACT

A latch mechanism for a lid of an overhead stowage compartment. The latch mechanism comprises a plurality of locking members, and a plurality of latches. Each latch is configured to engage one of the locking members, wherein the plurality of latches is configured to be mounted into a bottom of the overhead stowage compartment, and wherein the plurality of locking members is associated with a single lid of the overhead stowage compartment.

15 Claims, 7 Drawing Sheets

(56) References Cited

U.S. PATENT DOCUMENTS

| 2021/0147082 | A1* | 5/2021 | King | A47B 46/00 |
| 2021/0276714 | A1* | 9/2021 | Dwaraganathan ... | B64D 11/003 |
| 2022/0001985 | A1* | 1/2022 | Bathla | G06F 3/017 |
| 2022/0068531 | A1* | 3/2022 | Cloud | E05B 81/80 |
| 2022/0274708 | A1* | 9/2022 | Rheaume | B64D 11/003 |
| 2023/0026534 | A1* | 1/2023 | Fiala | E05C 3/26 |
| 2023/0039908 | A1* | 2/2023 | Patel | B64D 11/003 |

* cited by examiner

LATCH MECHANISM FOR AN OVERHEAD STOWAGE COMPARTMENT

CROSS-REFERENCES TO RELATED APPLICATIONS

This application claims the benefit of European Patent Application Number 23165179.5 filed on Mar. 29, 2023, the entire disclosure of which is incorporated herein by way of reference.

FIELD OF THE INVENTION

The present disclosure generally relates to a latch mechanism for an overhead stowage compartment as well as such overhead stowage compartment and an aircraft comprising the same. In particular, the present disclosure relates to a latch mechanism having a plurality of locking members associated with a single lid for an overhead stowage compartment and a plurality of associated latches. The present disclosure further relates to an overhead stowage compartment comprising such latch mechanism and an aircraft comprising such overhead stowage compartment.

BACKGROUND OF THE INVENTION

A conventional overhead stowage compartment is a box-like structure having a lid that can cover and close an opening into a stowage space of the compartment. The lid is usually equipped with a latch for locking the lid, which includes a corresponding handle and movable parts to unlock the latch and lid. For example, the handle can be pulled, in order to release the latch from a bar or hook arranged in the remainder of the overhead stowage compartment. Thereafter, the lid can freely move, to open the opening into the stowage space.

Such overhead stowage compartments are complex structures, since the latch and handle have to be installed in a corresponding recess or groove in the lid. Usually, the recess or groove has to be machined into the lid before the latch can be installed.

SUMMARY OF THE INVENTION

It is therefore an object of the present disclosure to provide an improved latch mechanism for an overhead stowage compartment.

This object may be solved by one or more embodiments of the present invention.

According to a first aspect to better understand the present disclosure, a latch mechanism for a lid of an overhead stowage compartment comprises a plurality of locking members, and a plurality of latches. Each latch is configured to engage one of the locking members. In other words, the plurality of locking members and the plurality of latches can respectively engage to provide a locking mechanism.

Furthermore, the plurality of latches is configured to be mounted into a bottom of the overhead stowage compartment, and the plurality of locking members is associated with a single lid of the overhead stowage compartment.

Since a plurality of latches and associated plurality of locking members are provided per lid, each pair of latch and locking member can be made smaller and lighter. Specifically, each latch and locking member has to withstand less forces acting thereon compared to a conventional single latch per lid design. This allows reducing the size of each individual latch and locking member, so that it downsizes and simplifies the entire latch mechanism.

This also allows designing the lid much simpler, as it only requires the plurality of locking members, which can be implemented without moving parts. Since the lid does not need to accommodate any moving parts, the lid itself can be made thinner and, hence, lighter. Moreover, in case of customizing an aircraft, such simpler lid can be replaced by a customized lid without considering any latch to be installed in the lid.

Furthermore, conventional lids are typically constructed from honeycomb or other thick materials to accommodate and securely hold the latch and moving parts and to withstand forces acting on the entire area of the lid, which are held only by a single latch (transferring the area load to a single point of attachment). Such materials are heavy, which results in more fuel consumption of a vehicle (e.g., an aircraft) equipped with such overhead stowage compartment.

The design of the latch mechanism of the present disclosure allows a simple design of the lid, which includes thinner materials, such as thermoplastic materials, or even thin and flexible materials, such as fabrics, foils, nets, tension cords or the like and combinations thereof. This may even allow providing a lid of a frameless design, where the sole rigid part is at a bottom area of the lid. For example, a simple rail equipped with the locking members may be arranged in the bottom area of the lid. Such rail may be made of a rigid plastic material or metal, such as aluminum. The remainder of the lid can then be made of the flexible material. Thus, the lid may be made lighter, can be produced in faster and less complex manufacturing processes, and can be recycled much better than conventional overhead stowage compartment materials.

Likewise, the plurality of latches constituting the active part of the latch mechanism are mounted in the bottom of the overhead stowage compartment, which is substantially stationary once installed. Since the bottom of the overhead stowage compartment is regularly designed strong enough to hold the weight of the luggage or cargo placed in the stowage space, there is no need to (significantly) redesign the bottom to accommodate the plurality of latches. For instance, a conventional bottom of an overhead stowage compartment provides sufficient height to accommodate the plurality of latches. In addition, the bottom of the overhead stowage compartment provides a strong perimeter around the latch. In other words, the bottom of the stowage compartment allows integrating a latch having a push mechanism or slide mechanism or the like.

Due to the plurality of latches and plurality of locking members, each latch and locking member can be dimensioned smaller and lighter. Specifically, the retention capability of each single latch and locking member can be reduced compared to a single latch solution as in conventional overhead stowage compartments, since the load acting on the lid is spread over the plurality of latches and locking members. Thus, the need for over-dimensioning as with a single latch solution (due to point loads of the largest overhead stowage compartment and/or worst loaded luggage) is eliminated with the latch mechanism of the present disclosure.

In an implementation variant, each latch of the plurality of latches can be formed as a double latch for redundancy and security measures. Nevertheless, both latches are so close to one another that they can be considered statically as one point.

In another implementation variant, the number of latches of the plurality of latches associated with the lid may be equal to the number of locking members associated with the lid. Thus, a particular number of pairs of latches and locking members holds the lid.

Alternatively, the number of latches of the plurality of latches associated with the lid may be different from the number of locking members associated with the lid. For instance, the number of locking members associated with the lid can be smaller than the number of latches associated with the lid. As a mere example, the lid does not provide locking members at certain positions corresponding to a latch. In other words, when the lid is closed, some of the latches are unused (not engaging a locking member).

Alternatively, a position for one of the plurality of latches is left empty, i.e., only an opening or recess for receiving the locking member is provided at the bottom of the overhead stowage compartment.

In any case, 50 to 90%, preferably 60 to 90%, and most preferably 80% of the latches can be unused or empty.

In another implementation variant, the plurality of latches can be mounted into a front edge of a bottom plate of the overhead stowage compartment.

Additionally or alternatively, a fingertip rail or handrail may be arranged at a front edge of the bottom plate of the overhead stowage compartment, and the plurality of latches can be mounted in, above or near to the fingertip rail or handrail. As a mere example, such rail can be made of a rigid plastic material or a metal, such as aluminum.

The solutions involving a rail (fingertip rail, hand rail and/or rail at bottom area of the lid) allow an integration of the latch mechanism into a plurality of differently designed overhead stowage compartments. Thus, a uniform look and design for overhead stowage compartments can be provided for a complete fleet of vehicles.

In a further implementation variant, the plurality of latches can be configured to simultaneously engage or disengage the plurality of locking members. Thus, the latch mechanism can open (free the locking members) in a fast manner.

In an implementation variant, each of the plurality of locking members can have an eye configured to be coupled with one of the plurality of latches. Such eye can be a through hole through a protruding locking member, or a loop, frame or bracket protruding from the lid allowing the latch to undercut or clasp the locking member. The locking member can protrude from an inner surface of the lid towards the stowage space of the overhead stowage compartment, and particularly towards the bottom of the overhead stowage compartment.

In a further implementation variant, the latch mechanism can further comprise a latch lever coupled to the plurality of latches and configured to move each of the plurality of latches simultaneously. For instance, the latch lever can be a bar arranged along the plurality of latches, so that each of the plurality of latches can be coupled or mounted to the latch lever. When moving the latch lever, the coupled latches correspondingly move. For example, the latch lever can be employed to move between an open position, where the plurality of latches is disengaged from the respective locking members, and a locked position, where the plurality of latches is engaged with the respective locking members.

In yet a further implementation variant each latch can include a latch bolt configured to engage the eye of the one locking member. It is to be understood that the latch bolt can also be configured to engage the through hole through a protruding locking member, the loop, frame or bracket protruding from the lid or any other element forming the locking member. In any case, the latch bolt provides at least a section overlapping with at least a section of the locking member in a direction in which the lid opens, i.e., in a direction where the main forces of the lid will act. As a mere example, the latch bolts can be arranged to extend perpendicular to the locking member and co-axial with the eye. Furthermore, the latch bolts can be arranged to extend perpendicular to a moving direction of the lid between an open position and a closed position of the lid (i.e., perpendicular to a moving direction of the locking member).

Furthermore, in case the plurality of latches are each formed as a double latch, two latch bolts are provided close to one another.

In an implementation variant, the plurality of latches can include an electromagnetic latch or an electrically driven latch. This allows engaging and disengaging one or more of the plurality of latches from its/their associated locking member. Particularly, the engaging and disengaging of a latch can be performed individually, in groups, or all at once. An electromagnetic latch or electrically driven latch further allows controlling the plurality of latches from a central control panel arranged apart from the latch mechanism. For instance, a cabin assistant or pilot may have access to a control allowing opening and closing the latches.

In another implementation variant, the latch mechanism can further comprise a latch activation configured to engage or disengage the plurality of latches with the plurality of locking members. The latch activation can also be referred to as a latch actuator or any device capable of mechanically changing the state of the plurality of latches. The latch activation can include any active or inactive device, such as a motor, a lever, a gear or the like.

In yet another implementation variant, the latch activation can comprise a latch button coupled to the latch activation. The latch button can form a manual activation of the latch mechanism. As a mere example, the latch button can be coupled to the latch lever or one or more latch bolts in such a manner, that pushing the latch button moves the latch lever or the latch bolt(s) between an engaging position and a disengaging position. The number of latches or latch bolt(s) activated by one latch activation can be arbitrarily chosen. In order to simplify the overall structure, a plurality of latches or latch bolt(s) can be activated by the latch activation.

In a further implementation variant, the latch button can be configured to be mounted into the bottom of the overhead stowage compartment. The bottom of the overhead stowage compartment is to be understood as any structure arranged at the bottom side of the overhead stowage compartment. For instance, the bottom can include a structurally relevant bottom plate carrying the loads of the stowage compartment as well as a bottom cover arranged at an underside of the bottom plate, which fulfils rather visual and aesthetic needs. Alternatively or additionally, the latch button can be integrated into the bottom cover of the overhead stowage compartment. In any case, the latch button can be placed close to the lid to be opened and, at the same time, (most of the button parts) can be hidden in the bottom or bottom cover.

Since the latch button is mounted into the bottom of the overhead stowage compartment, it is possible that only one surface of the button is exposed to the exterior (e.g., the surface on which the button is touched), while the remaining surfaces of the button are hidden in the bottom of the overhead stowage compartment. Thus, the finishing of the surfaces of the latch button can be restricted to the exposed surface, which significantly reduces manufacturing costs.

For instance, the latch and handle configuration of conventional single point latched overhead bins and lids comprises a plurality of large surfaces that are exposed and require a significant amount of surface finishing. This can be omitted in the solution provided by the present disclosure.

In another implementation variant, the rail may be produced longer than the width of one stowage compartment and/or one lid, i.e., the rail is associated with a plurality of stowage compartments and/or a plurality of lids. As a mere example, the rail may be manufactured by extruding or (cold or warm) drawing.

In yet another implementation variant, when the rail is longer than the width of a stowage compartment and/or a lid, the rail can include an arbitrary number of latch activations, such as latch buttons. As a mere example, only one latch button can be provided, which is used to engage or disengage all latches of the rail, i.e. engage or disengage all latches of all overhead stowage compartments and lids associated with the rail.

Alternatively, one latch button per lid can be installed in the rail.

In yet a further implementation variant, the latch activation can comprise an electric motor or a pneumatic motor. Thus, the engaging and disengaging of the latches with the locking members can be (semi-) automated. In addition, the latch activation can be controlled from a central control panel or another system implemented apart from the latch mechanism.

It is to be understood that the latch mechanism of this aspect and its variants can be implemented as one or more latch mechanisms per lid, or one latch mechanism per group of lids. This allows, on the one hand, a redundant closing mechanism (in case of more than one latch mechanism per lid). On the other hand, in case of one latch mechanism for multiple lids, a further simplification of the locking and opening of the lids is achieved. For instance, one latch mechanism can be used to control locking and opening one or more groups of lids. In any case, any combination of latch mechanism(s) and lid(s) can be implemented.

According to a second aspect to better understand the present disclosure, an overhead stowage compartment comprises a bottom, a lid, and a latch mechanism according to the first aspect or one of its variants.

Particularly, the plurality of latches of the latch mechanism is arranged in the bottom, and the plurality of locking members is integrated or fastened to the lid. This allows designing the lid much simpler, as it only requires the plurality of locking members, which can be implemented without moving parts. Since the lid does not need to accommodate any moving parts, the lid itself can be made thinner and, hence, lighter.

Likewise, the plurality of latches constituting the active part of the latch mechanism are mounted in the bottom of the overhead stowage compartment, which is stationary and essentially invariant, once installed. Since the bottom of the overhead stowage compartment is regularly designed strong enough to hold the weight of the luggage or cargo placed in the stowage space, there is no need to (significantly) redesign the bottom to accommodate the plurality of latches. For instance, a conventional bottom of an overhead stowage compartment provides sufficient height to accommodate the plurality of latches.

Since a plurality of latches and associated plurality of locking members are provided, each pair of latch and locking member can be made smaller and lighter. Specifically, each pair of latch and locking member has to withstand less forces acting thereon compared to a conventional single latch per lid design. This even allows reducing the size of each individual latch and locking member, so that it downsizes and simplifies the entire latch mechanism.

In an implementation variant, the overhead stowage compartment can comprise a bottom cover that is coupled to an underside (lower exterior side) of the bottom (actually a bottom plate). This further facilitates mounting the plurality of latches to the bottom of the overhead stowage compartment. For instance, the bottom cover may cover the plurality of latches, so that the latches can simply be installed at the underside of the bottom (plate).

Alternatively or additionally, the latches or at least a portion thereof can be installed inside of the bottom cover.

Alternatively or additionally, the latches or at least a portion thereof can be installed inside of the bottom plate.

Further alternatively or additionally, the latches or at least a portion thereof can be installed in a rail running along the front edge of the bottom cover and/or the bottom plate of the overhead stowage compartment. In other words, such rail can form at least a portion of a front edge of the visible part of the overhead stowage compartment close to the bottom area of the lid. The rail can be provided at the bottom plate of the overhead stowage compartment, at the bottom cover or at the bottom plate and the bottom cover, e.g., closing the space between the front edges of the bottom plate and bottom cover. The rail can be the fingertip rail or handrail arranged at a front edge of the bottom plate of the overhead stowage compartment. As a mere example, such rail can be made of a rigid plastic material or a metal, such as aluminum.

In any case, the latches can be arranged inside of a cross-section of the bottom cover or bottom plate. In order for the locking members to reach the latches, a plurality of openings can be provided in the bottom cover or bottom plate. Such openings can be sized to receive the respective locking member. In addition, the size of the opening can be chosen, so that the locking member abuts one or more sides of the opening, thereby closing the opening without any gaps.

Furthermore, in order to protect the latches, the plurality of openings can be covered by a flap or the like closing the opening. For instance, the flap can be arranged flush with a surface of the bottom cover or bottom plate surrounding the opening. In addition, the flap can be pushed away by locking member when the lid is closed and the locking member enters the opening period In another implementation variant, one or more of the plurality of locking members that is arranged at a center of the lid can have a respective eye of a first cross-sectional area, wherein one or more of the plurality of locking members that are arranged away from the center of the lid have a respective eye of a second cross-sectional area, and wherein the second cross-sectional area is larger than the first cross-sectional area. The eye of the locking members forms a portion of the locking member engaging with a respective latch. For instance, the respective latch can be coupled (e.g., inserted) into the eye of the locking member, when in a locking position.

Since all latches can be made of the same size, the differently sized eyes can be used to compensate for any tolerances or deviation of the position of the locking members in relation to the corresponding latches, or any tolerances or deviation of the position of the latches in relation to the corresponding locking member. The larger eyes facilitate receiving the associated latch, when the latch moves from a disengaging state to an engaging state.

It is to be understood that providing the locking members having an eye of smaller cross-sectional area (i.e., having the first cross-sectional area) at the center of the lid is only an example. The locking members having an eye of larger cross-sectional area (i.e., having the second cross-sectional area) can be provided anywhere at the lid, i.e. irrespective of the center of the lid. For instance, the eyes having the larger cross-sectional area can be provided where the largest tolerances of the relative position of latch and locking member are expected.

In yet another implementation variant, the overhead stowage compartment can further comprise a pair of magnets, wherein a first magnet is mounted to the lid facing the bottom and a second magnet is mounted to the bottom facing the first magnet in the lid. This facilitates closing the lid, as each of the pair of magnets attracts its respective counterpart. The closing of the of magnets further facilitates bringing the locking member into a position where the associated latch can engage in an easy and secure manner (i.e., without dislocated locking members). Thus, the latch and locking member can be designed simpler as a "pre-positioning" is achieved by the pair of magnets and the corresponding tolerances may be reduced.

In a further implementation variant, the plurality of latches and plurality of locking members can be arranged equally spaced from one another. This allows an independent positioning of the at least one lid, since any of the plurality of latches (or any subset thereof) can be used by the corresponding equally spaced locking members.

In yet a further implementation variant, the overhead stowage compartment can further comprise a plurality of hinges configured to couple the at least one lid to the overhead stowage compartment. The individual hinges of the plurality of hinges can be arranged equally spaced from one another. This allows an independent positioning of the at least one lid, since any of the plurality of hinges (or any subset thereof) can be used.

Alternatively or additionally, the overhead stowage compartment can further comprise a piano-type hinge configured to couple the lid to the overhead stowage compartment.

In a further implementation variant, if the frameless design of the lid including thinner materials, such as thin and flexible fabrics, foils, nets, tension cords or the like, is employed, these thinner materials may be linearly mounted to a top portion of the overhead stowage compartment. For example, the thinner materials may simply be clamped at the top portion of the overhead stowage compartment.

As with the plurality of latches and plurality of locking members, the plurality of hinges and/or piano hinge and/or clamped lid distributes any load to be transferred from the lid to the overhead stowage compartment. Compared to conventional overhead stowage compartments, where the lid is hinged on the two sidewalls of the compartment, each individual hinge of the present disclosure has to transfer smaller forces. Thus, a further simplification of the lid can be achieved.

In yet another implementation variant, the overhead stowage compartment can comprise a plurality of knuckles and the at least one lid can comprise a plurality of pins, each pin being configured to be inserted into one of the knuckles. The pins can be arranged equally spaced from one another. The pattern of the plurality of pins can correspond to a pattern of the plurality of knuckles. This allows mounting the lid anywhere along the longitudinal direction of the overhead stowage compartment.

Alternatively, the at least one lid can comprise a plurality of knuckles and the overhead stowage compartment can comprise a plurality of pins, each pin being configured to be inserted into one of the knuckles. The pins and knuckles can be arranged equally spaced from one another, while both have a corresponding pattern. This allows mounting the lid anywhere along the longitudinal direction of the overhead stowage compartment.

As a mere example, the plurality of knuckles can comprise five or more knuckles and the plurality of pins can comprise five or more pins. In other words, one lid is mounted to the overhead stowage compartment by at least five pins and knuckles. This provides for a better distribution of the loads of the lid into a hull of the overhead stowage compartment. The hull of the overhead stowage compartment means any structure forming the stowage space, including the bottom (plate) and a rear wall or ceiling. This allows overall thinner and lighter structures for the lid and the hull, since no point load has to be introduced into the hull and/or lid.

In yet a further implementation variant, the plurality of hinges or the piano hinge or the lid comprises one or more openings allowing smoke to escape from a stowage space of the overhead stowage compartment. In other words, the one or more openings allow a fluid (particularly a gas) present in the stowage space to escape to an ambient area.

In an implementation variant, components of the overhead stowage compartment (or at least portions thereof) and/or the at least one lid can be made of a thermoplastic material. Such component can be the bottom, a rear wall, ceiling or the like. This allows pressing, such as deep drawing, or extruding the components and/or the lid, which are cost-effective manufacturing methods. Compared to conventional honeycomb plates and forms, the overhead stowage compartment components and lid of the present disclosure can be made more cost-effective, thinner and lighter.

Moreover, a thermoplastic material can be reused or recycled, while the honeycomb plates and forms of conventional stowage compartments cannot be easily recycled. In addition, each of the components of the disclosed overhead stowage compartment can be made of a material best suitable for the purposes of the component, which also facilitates reusing and recycling, as no material mixture or blend is present in these components.

The components of the overhead stowage compartment and/or the at least one lid can further be reinforced. For instance, fiber reinforcement may be applied to the components and/or the at least one lid. Alternatively or additionally, a tension cord or net may be supplemented or integrated to the components and/or in the at least one lid. As a mere example, such fiber reinforcement, tension cord or net may be laid out in the material of the components and/or lid in form of a strand (e.g., linear section) and/or in form of a truss (e.g., a zigzag pattern inside of the hull/lid).

In another implementation variant, the at least one lid can at least partially be made of a fabric. For instance, due to the plurality of hinges and latches at each lid, the lid can be designed in view of only the limit loads needed to contain the luggage stored inside, while accepting some elastic deformation. This makes the lid much lighter than conventional stowage compartment lids. The lid can further be attached or connected to the overhead stowage compartment and a simplified manner, for example by clamping the fabric to a top portion of the overhead stowage compartment.

According to a third aspect of the present disclosure, an aircraft comprising at least one overhead stowage compartment according to the first aspect or one of its implementation variants.

The overhead stowage compartment can be installed above a plurality of seat rows, where the opening to the stowage space of the overhead stowage compartment is accessible from an aisle running in a longitudinal direction of the aircraft adjacent to the seat rows. The lid can then be mounted to the overhead stowage compartment in such a manner, that it opens above the seats and/or above the aisle.

As a mere example, the aircraft can comprise an overhead stowage compartment with a body having a length in a longitudinal direction of the aircraft exceeding the length of a lid. This allows mounting the lid anywhere at the body along the longitudinal direction. Thus, a redesign of the aircraft (particularly the aircraft cabin) can be achieved.

The latch mechanism of the present disclosure comprising a plurality of latches and a plurality of associated locking members facilitates the redesign of the aircraft. Specifically, a lid can be mounted to the overhead stowage compartment anywhere along the longitudinal direction. Since the overhead stowage compartment is provided with latches along its entire length (or at least a large part thereof), the locking members of a lid can use any group of latches. For example, the latches and the locking members can be arranged in accordance with a particular grid or pattern, which allows mounting the lid anywhere along the longitudinal direction and having the locking members positioned in accordance with this grid or pattern. Thus, the disclosed overhead stowage compartment further provides great flexibility, even after installation thereof.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
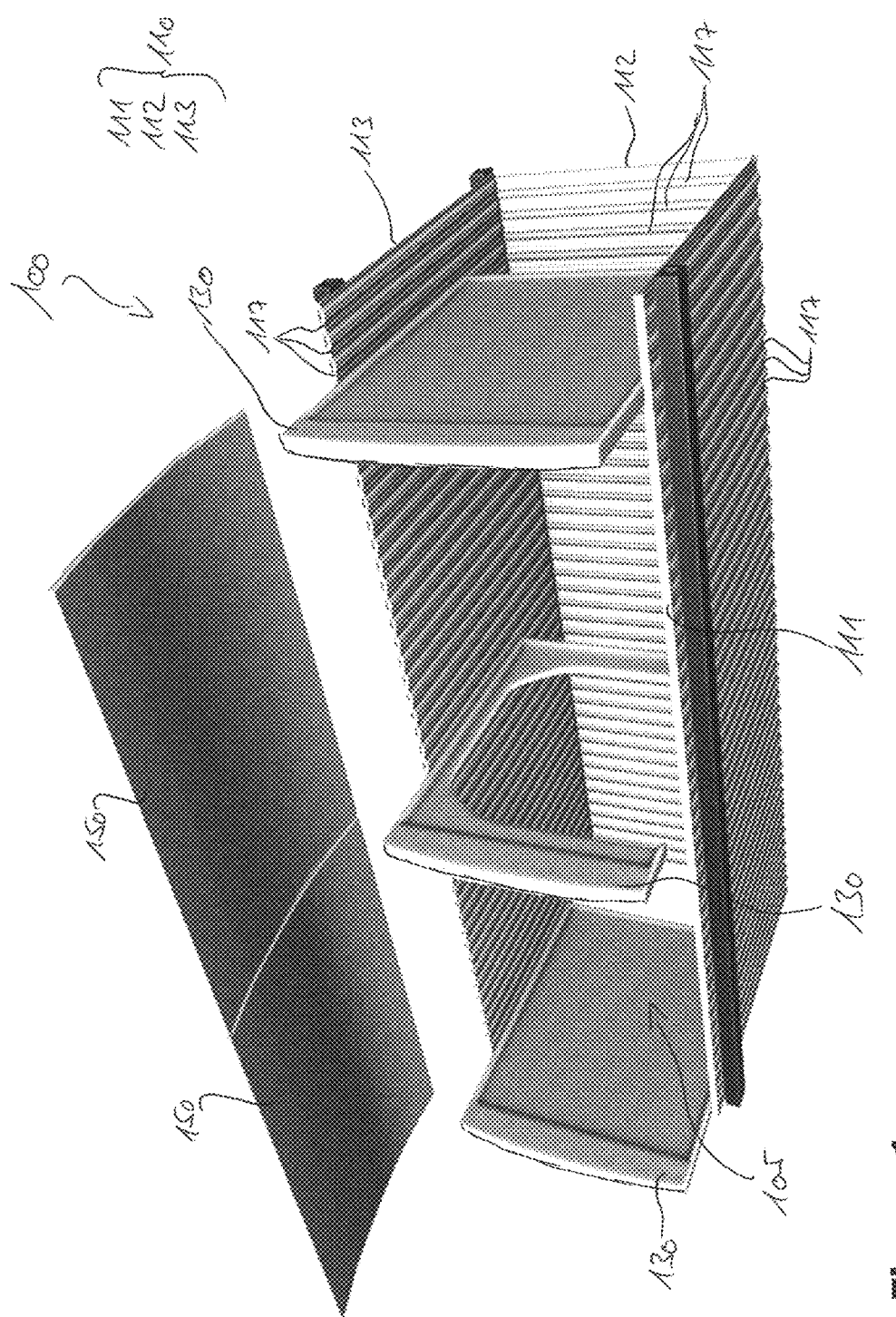
FIG. 1 schematically illustrates a perspective and exploded view of an exemplary stowage compartment.
Figure 4:
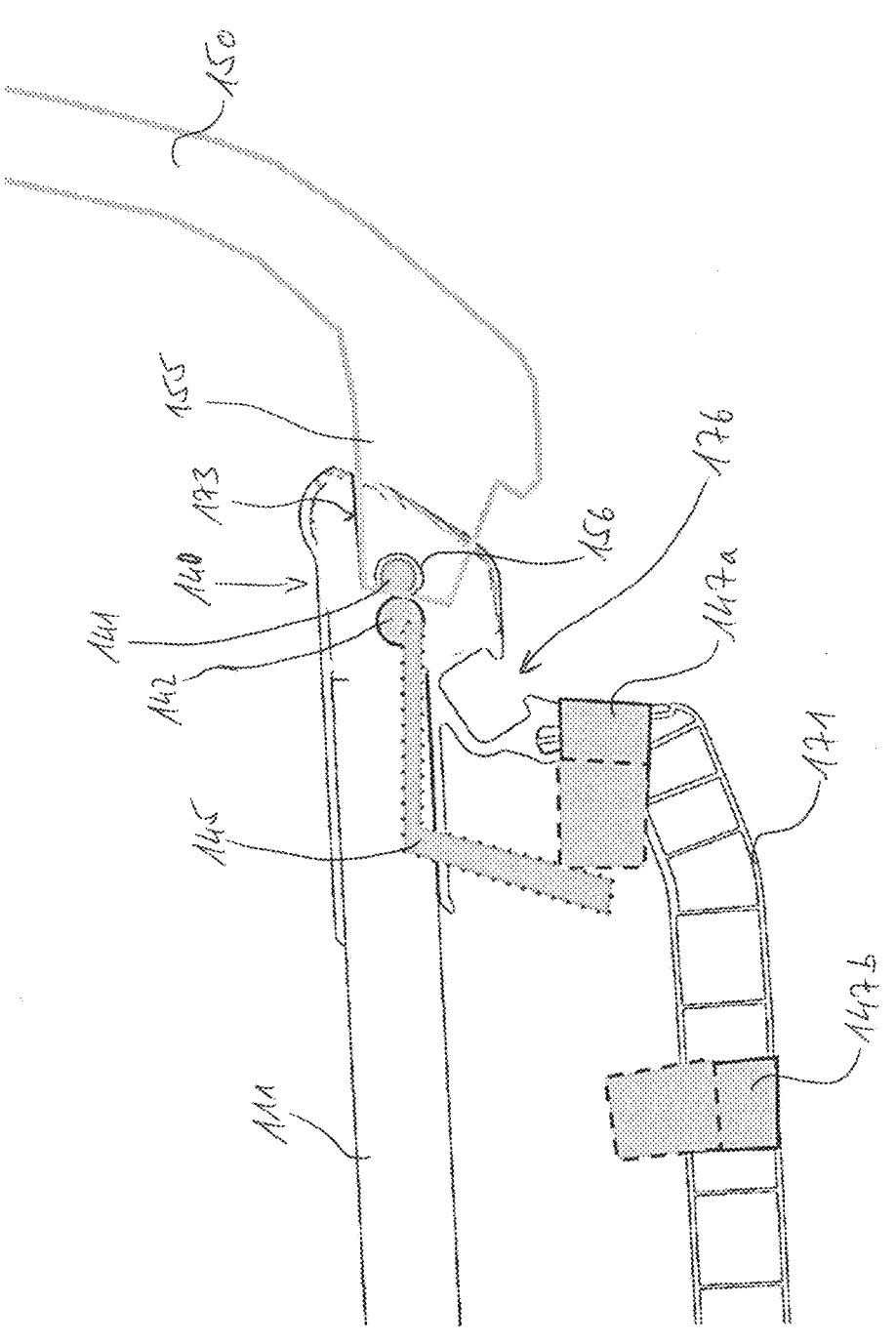
FIG. 4 schematically illustrates a cross-section of an exemplary latch mechanism.

FIG. 1 schematically illustrates a perspective and exploded view of an exemplary stowage compartment 100. The stowage compartment 100 encloses a stowage space 105, for example, for placing luggage or cargo therein. The stowage space 105 is delimited by a bottom or bottom plate 111, which could be covered with a lining or a bottom cover 171 (FIG. 4). The schematically illustrated stowage compartment 100 further comprises a rear wall 112 and a ceiling 113 further delimiting the stowage space 105. The bottom 111, rear wall 112 and ceiling 113 together can be referred to as a hull 110 of the overhead stowage compartment 100. A separation of the stowage space 105 along the longitudinal direction (left right direction in FIG. 1) can be achieved by one or more separating walls 130. Thus, individual stowage spaces can be formed, while the size of such stowage spaces can be arbitrarily chosen and adapted anytime.

The front of the stowage compartment 100, particularly the opening into the stowage space 105, can be closed by one or more lids 150, two of which are illustrated in FIG. 1. As a mere example, a lid 150 can be mounted to the stowage compartment 100, for example, to the ceiling 113, in correspondence with the separating walls 130.

The stowage compartment 100 may be provided with a plurality of notches 117, arranged particularly at an interior side (facing the stowage space 105). For instance, the bottom 111 and/or the ceiling 113 and/or the rear wall 112 may have such plurality of notches 117. While the notches 117 can be provided only on the interior side, the material of the hull can be formed as a trapezoidal sheet (having an S-shaped or zigzag cross-section along the longitudinal direction). Such shape can be formed by pressing, such as a deep drawing, the material of the hull 110.

The notches 117 can be configured to receive the separating walls 130. Thus, the notches 117 can be used to provide a predefined grid or pattern for installation of separating walls 130. Such grid or pattern may correspond to a grid or pattern of a seating rail (not illustrated) in an aircraft 1 (FIG. 8) equipped with such overhead stowage compartment 100, so that a separating wall 130 can be installed in the stowage compartment 100 in correspondence to seat rows (not illustrated) in the aircraft 1. As a mere example, the grid or pattern of the notches 117 (the distance between the respective center of two notches 117) can be 1 inch, 2 inch or 3 inch.

The separating walls 130 can be slid into such notches 117, for example into a notch 117 in the bottom 111 and/or into a notch in the ceiling 113. For example, the separating wall 130 can be inserted into the stowage space 105 until the separating wall 130 reaches the rear wall 112, in order to separate the stowage space 105. Once in place, the separating walls 130 can be mounted to the hull 110. For example, fasteners, such as screws or rivets, can be used to fasten the separating walls 130 in a force transferring manner to the hull 110. Such fasteners can be placed through the hull 110 into a front face of the separating wall 130, for example, the front face of a separating wall 130 placed in the notch 117. Alternatively, a flange or similar structure adjacent to the separating wall 130 can be provided, which is fastened to the hull 110 as well as to the separating wall 130, or which is integrated into the hull 110 and fastened to the separating wall 130, or vice versa.

Figures 2, 3:
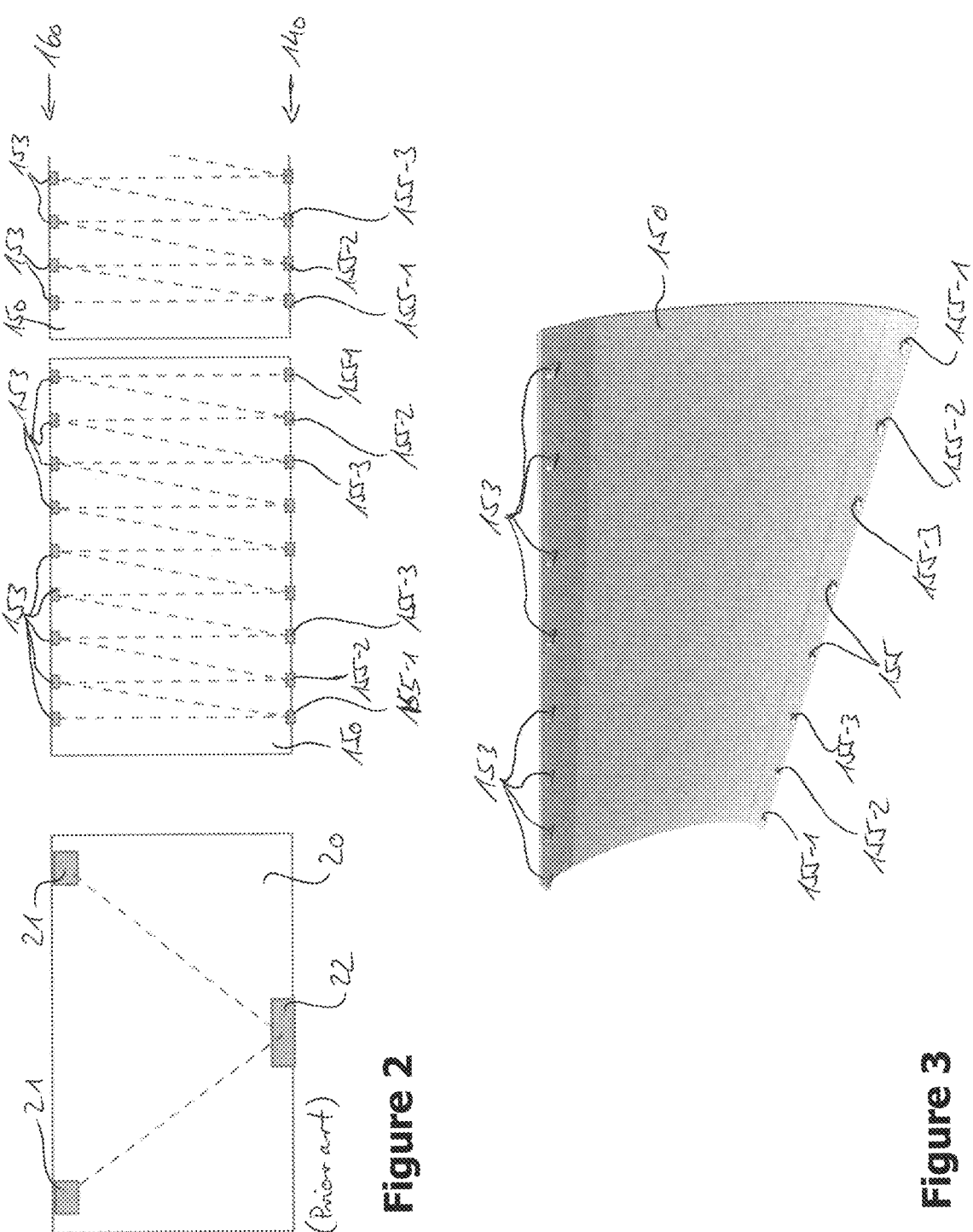
FIG. 2 schematically illustrates hinge and latch concepts of a conventional lid and a lid according to the present disclosure.
FIG. 3 schematically illustrates a perspective view of an interior side of a lid.

FIG. 2 schematically illustrates hinge and latch concepts of a conventional lid 20 (left part of FIG. 2) and a lid 150 according to the present disclosure (right part of FIG. 2). A conventional lid 20 is usually provided with two hinges 21 at the upper corners of the lid 20. A latch 22 is provided at a center of the bottom edge of the lid 20. Any area load acting on the lid 20 has to be transferred via the two hinges 21 and the latch 22. FIG. 2 illustrates the dashed lines to indicate the regions of the largest forces (loads) in the lid 20.

With reference to FIGS. 2 and 3, the lid 150 of the present disclosure, is mounted by a plurality of hinges, one part 153 of which is coupled to the lid 150 or is integrated into the lid 150. For instance, a pin 153 or other hinge portion can be integrated into the lid 150 at an upper region of the lid 150. As a mere example, the hinge portion associated with the lid 150 can be arranged in accordance with a certain grid or pattern, i.e. the hinge portions are equally spaced along the longitudinal direction of the overhead stowage compartment 100 (left right direction in FIG. 2). The location of each of the hinge portions may, for example, correspond to a location of a notch 117 or the area between two adjacent notches 117.

In a bottom region of the lid 150, a part of a latch mechanism 140 may be provided. For instance, a plurality of locking members 155 are fastened to the lid 150 or are integrated into the lid 150. Such locking members 155 form part of the latch mechanism 140, which will be explained in more detail with reference to FIGS. 4 to 6. As can be derived from the dashed lines, the highest forces (loads) acting on the lid 150 are distributed over the plurality of hinges, e.g., the pins 153, and the plurality of locking members 155. Thus, the lid 150 can be designed lighter and particularly thinner.

In view of FIGS. 1 to 3 it is apparent that the lid 150 can be mounted to the overhead stowage compartment 100, particularly its hull 110, almost anywhere along the longitudinal direction of the stowage compartment 100. The sole constrain is the grid of hinges 160 and locking members 155, particularly the distance between two hinges 160 and correspondingly two locking members 155. Thus, a redesign of the overhead stowage compartment 100 with respect to the location of the lid 150 can be achieved any time and in a simple manner.

FIG. 4 schematically illustrates a cross-section of an exemplary latch mechanism 140 for a lid 150. The latch mechanism 140 comprises a plurality of locking members 155 (FIG. 3), which can be integrated into the lid 150. For instance, each locking member 155 can protrude or extend from an inner side (inner surface) of the lid 150.

The latch mechanism 140 further comprises a plurality of latches 141, wherein each latch 141 is configured to engage one of the locking members 155. The plurality of latches 141 is mounted into the bottom plate 111 of the overhead stowage compartment 100. At a front edge of the bottom plate 111, there can be a fingertip rail or handrail 176, which can be used by passengers for holding themselves. The plurality of latches 141 can be mounted into the front edge of the bottom plate 111 and/or above or near to the handrail 176.

In any case, in order to allow the locking member 155 to reach the position of a latch 141, the bottom plate 111 can have an opening or recess 173. The bottom plate 111 is provided with a plurality of such recesses 173 along the longitudinal direction of the stowage compartment 100 corresponding to the number of latches 141.

As a mere example, such opening or recess 173 may be closed by a flap (not illustrated), when the locking member 155 is not present. The flap may be designed and configured to be pushed away (e.g., into an interior area of the bottom plate 111) by the locking member 155 when moving into a closed position, i.e., moving towards the latch 141 (to the left in FIG. 4).

The latch mechanism 140 can further comprise a latch lever 142 coupled to the plurality of latches 141. With reference to the example illustrated in FIG. 5, the latch lever 142 can be configured to move each of the plurality of latches 141 simultaneously. For instance, the plurality of latches 141 can be mounted to or can be integrated to the latch lever 142. The latch lever 140 may be coupled to the hull 110, particularly, to the bottom plate 111 of the hull 110. The latch lever 140 may be mounted to the hull 110 in a manner that it can be slid or otherwise moved in a direction parallel to the extending direction of the latch bolts 141 (indicated in FIG. 5 as arrows).

Each latch 141, for example, can include a latch bolt 141 that can be configured to engage an eye 156 of one locking member 155. Such eye 156 can be formed in the locking member 155 as a through hole, a recess or the like. Alternatively, a bracket, clip or similar protruding element may be provided at the bottom region of the lid 150 and having an opening allowing the latch 141 to engage therein.

In case the plurality of latches is formed as a double latch for redundancy and security measures, two latch bolts (not illustrated) close to one another are provided, which can engage the same eye 156 or two separately arranged eyes (not illustrated). Thus, such double latches (and double eyes) can be considered statically as one point.

Figure 5:
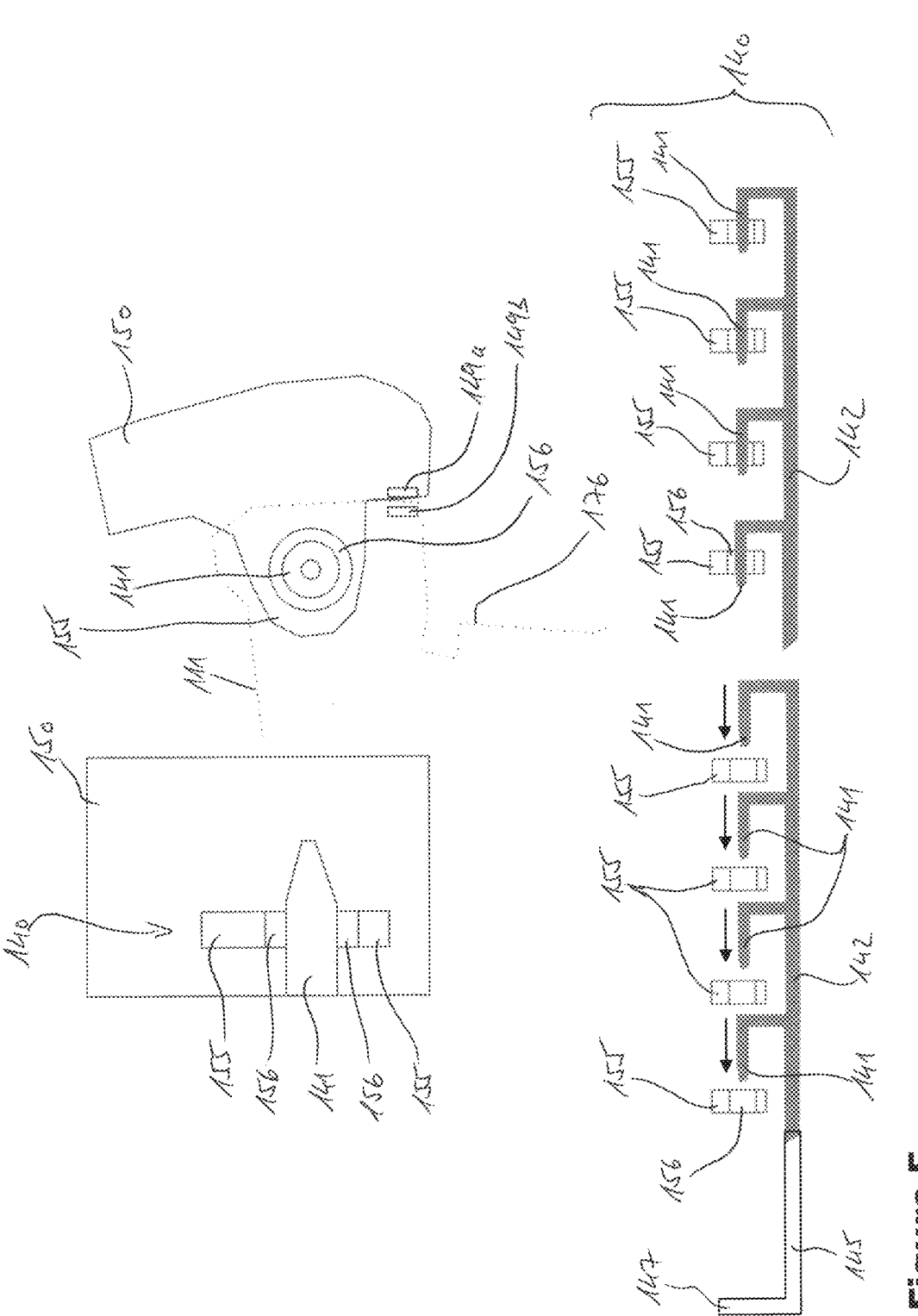
FIG. 5 schematically illustrates different views of an exemplary latch mechanism.

FIG. 5 schematically illustrates details of a latch mechanism 140 for the lid 150. In the upper portion of FIG. 5 there are cross sections of a closed latch mechanism 140 viewing perpendicularly to the longitudinal direction and along the longitudinal direction of the stowage compartment 100, respectively. In the lower portion of FIG. 5 are top views of the latch mechanism 140 in a disengaged position and an engaged position, respectively.

Specifically, the locking members 155 may form a protrusion on the inner side of the lid 150. Each of the locking members 155 can include an eye (recess, or through hole) 156.

Once the lid 150 is in the closed position, the eyes 156 of all locking members 155 are in a position corresponding to a tip end of the latch bolt 141 (see the lower left side in FIG. 5). Specifically, the latches or latch bolts 141 are in a disengaging position. Optionally, the latch lever 142 may be configured to rotate around its longitudinal axis, in order to bring the latch bolts 141 into correspondence with the eyes 156. In any case, when the latch lever 142 is moved along its longitudinal direction into a locking position, each latch bolt 141 engages an eye 156 of one of the locking members 155 (see the lower right side in FIG. 5).

Due to the large number of locking members 155 and latch bolts 141, the forces to be transferred from the lid 150 into the hull 110 can be better distributed compared to conventional stowage compartments. Thus, the lid 150 can be made of a thinner and lighter material, as the major load case is holding back luggage and goods from leaving the stowage space 105. In addition, the large number of locking members 155 and latch bolts 141 allows installation of the lid 150 in an arbitrary longitudinal position of the hull 110. The finer the grid or pattern of the locking members 155 and latch bolts 141, the finer is the freedom of installation position of the lid 150 relative to the hull 110.

As a mere example, the grid or pattern of the locking members 155 and latch bolts 141 may correspond to the grid or pattern of the hinges 160, so that the lid 150 can be easily placed at different positions along the hull 110.

It is to be understood that the number of locking members 155 may be different from the number of latches 141. For instance, while the grid or pattern of latches 141 may be provided in the bottom portion 111, 171 of the overhead stowage compartment 100, the lid 150 may comprise less locking members 155 than latches 141 are provided in the area overlap by the lid 150. As a mere example, the outer locking members 155-1 (FIG. 3) or the center locking members 155 may be omitted, if the forces from the lid 150 can be transferred to the latches 141 by this (reduced) number of locking members 155. This simplifies the closing of the lid 150 and the engaging of the latches 141.

In the illustrated example, the latch mechanism 140 further comprises a latch activation 145 configured to engage or disengage the plurality of latches 141 with the plurality of locking members 155.

According to one example, the latch activation 145 can comprise an electric motor or pneumatic motor (not illustrated). Such motor can move the latch lever 142. Alternatively, a plurality of motors can each move one latch bolt 141, so that each latch 141 can be engaged and disengaged individually.

According to another example, as illustrated in FIGS. 4 and 5, the latch activation 145 can comprise an extension of the latch lever 142, for example in a longitudinal direction of the stowage compartment 100 and/or in a cross-sectional direction of the stowage compartment 100 (left and right direction in FIG. 4). Such extension primarily connects a latch button 147 of the latch activation 145 with the latch lever 142. Pushing the latch button 147 moves the latch activation 145 and, hence, the latch lever 142 and latches 141, for example, towards the disengaging position of the latches 141.

Optionally, a biasing element (not illustrated) may be provided and configured to bring the latch button 147 back to its starting position and, hence, to bring the latches 141 back to their engaging position.

The latch activation 145 may also be configured to perform at least partially a pivoting movement when the latch button 147 is pushed. As a mere example, latch button 147a in FIG. 4 may be pushed towards the interior of the bottom 111, 171 (to the left in FIG. 4). This movement may be translated by the latch activation 145 into a linear movement and/or a rotating movement of at least a portion of the latch activation 145, so that in the end the latches 141 are moved between the engaging and disengaging positions (see lower portion of FIG. 5).

Alternatively, the latch button 147a may be pushed along the longitudinal direction of the overhead stowage compartment 100 (into the drawing plane of FIG. 4 or to the right in the lower portion of FIG. 5). This movement of the latch button 147a already corresponds to the movement of the latches 141, so that no translation of movements is necessary.

As illustrated in FIG. 4, the latch button 147 can be arranged at different positions. FIG. 4 illustrates two possible examples of a latch button 147. One possible button 147a is arranged at a front face of a bottom cover 171. Another possible latch button 147b is arranged at a bottom face of the bottom cover 171. Both positions are optional and one or both can be chosen depending on the design of the bottom 111, 171.

It is to be understood that the latch button 147 as well as the latch activation 145 may be arranged at different positions. For instance, the overhead stowage compartment 100 may not comprise a bottom cover 171, but the bottom plate

111 is formed with sufficient space for accommodating the latch button 147 and the latch activation 145.

FIG. 5 further illustrates a pair of magnets 149. A first magnet 149a can be mounted to the lid 150 facing the bottom 111, when the lid 150 is in the closed position (as illustrated in FIG. 4 and upper right portion of FIG. 5). A second magnet 149b can be mounted to the bottom 111 facing the first magnet 149a in the lid 150, when the lid 150 is in the closed position. The pair of magnets 149 are configured to attract themselves once they are close to one another. Thus, the lid 150 can be closed and can be brought in the vicinity of the bottom 111. Once the pair of magnets 149 attract themselves strong enough, the magnets 149 bring the lid 150 and, hence, the locking members 155 into the closed position, ready for the latches 141 to move into their engaging position.

It is to be understood that the latches 141 may not be coupled to a latch lever 142, but can be individually moved between the engaging and disengaging positions. Although not illustrated in the drawings, the plurality of latches 141 can include an electromagnetic latch or an electrically driven latch. Thus, an electromagnetic force can be used to drive the latch 141 between the engaging and disengaging positions. Likewise, a rotating shaft of a motor or a linear motor can be used to move the latch 141 between the engaging and disengaging positions. Each latch 141 can be equipped with a separate and individual electromagnetic component or motor.

Alternatively, the electromagnetic component or motor can be used to drive the latch lever 142, i.e., to drive a group of latches 141 coupled to the latch lever 142.

Figure 6:
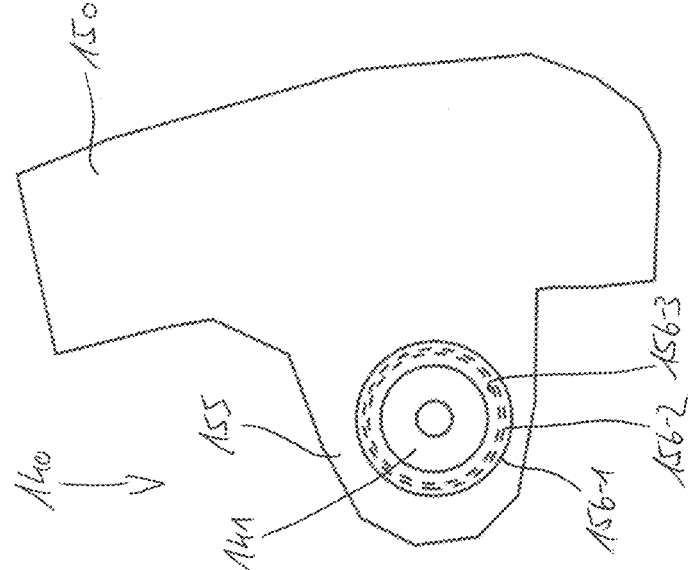
FIG. 6 schematically illustrates a cross-section of an exemplary latch mechanism.

FIG. 6 schematically illustrates a cross-section of an exemplary latch mechanism 140. With additional reference to FIG. 3, the locking members 155 may be provided with differently sized eyes 156 (or through holes, recesses, etc.). In more detail, one or more locking members 155 and 155-3 that are arranged at a center of the lid 150 can have a respective eye 156-3 of a first cross-sectional area, while one or more locking members 155-2, 155-1 that are arranged away from the center of the lid 150 can have a respective eye 156-2, 156-1 of a second and third cross-sectional area, respectively. The second cross-sectional area can be larger than the first cross-sectional area (e.g., of eyes 156-3), and the third cross-sectional area (e.g., of eyes 156-1) can be larger than the second cross-sectional area (e.g., of eyes 156-2).

Such differently sized eyes 156 allow compensating for tolerances. As a mere example, the positioning of the locking members 155-1 at the outer ends of the lid 150 in the correct position relative to the latches 141 may be more difficult and requires a large tolerance, which can be achieved by a larger cross-sectional area of the respective eye 156-1. It is to be understood that the size of the eyes 156 may not depend on the center of the lid 150, but can also be chosen based on the tolerances of the latches 141, and/or the tolerances of the latch lever 142, and/or the tolerances of the locking members 155, or the like.

Figure 7:
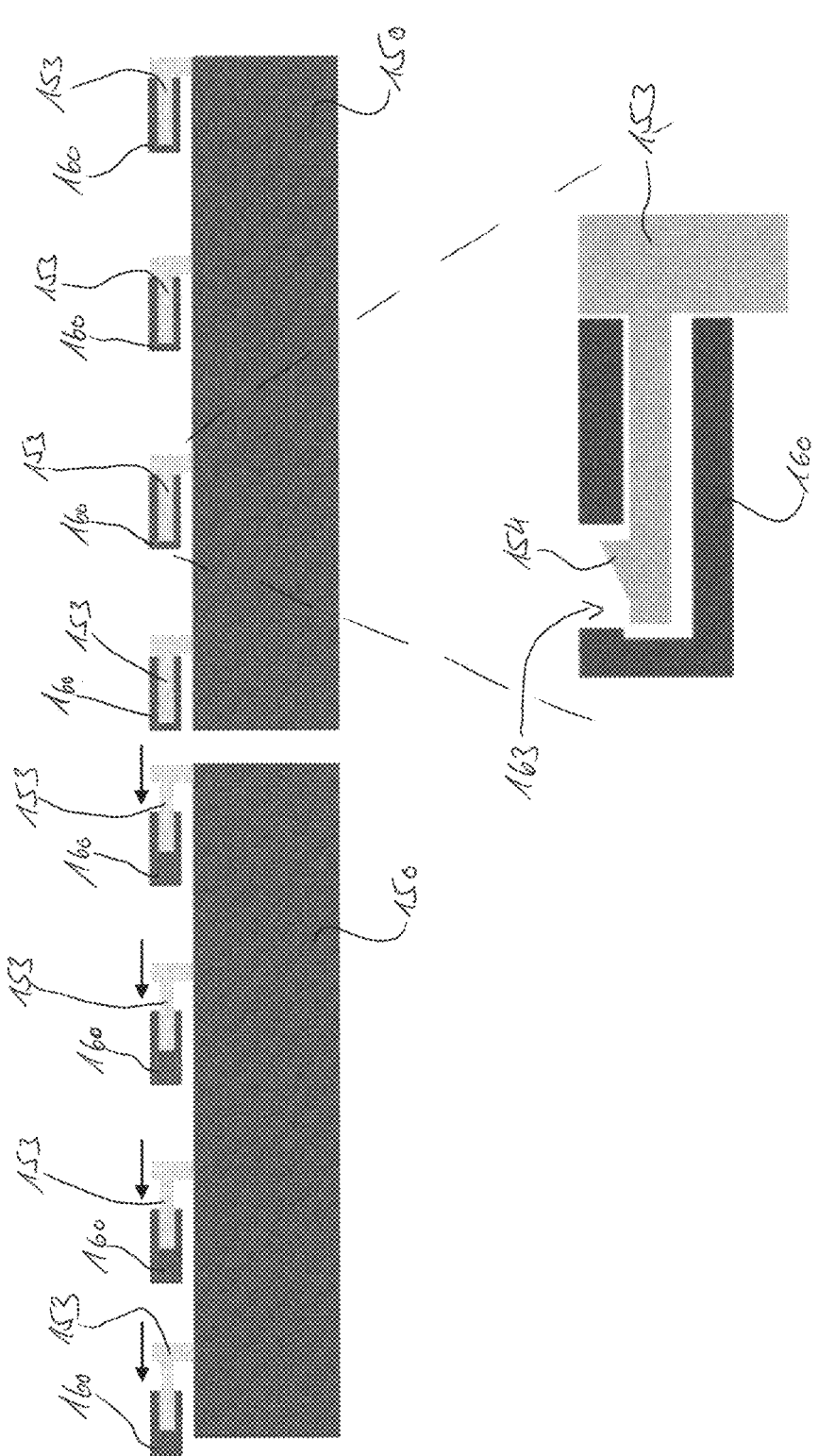
FIG. 7 schematically illustrates hinges for a lid during installation of the lid.

FIG. 7 schematically illustrates hinges 160 between a hull 110 and lid 150 during installation of the lid 150. On the left-hand side in FIG. 7, the lid 150 is illustrated as having a plurality of pins 153. Such pins 153 may include a bracket extending from the upper end (edge) of the lid 150, so that the corresponding pin 153 is spaced apart from the upper end (edge) of the lid 150. The hull 110 (not illustrated in FIG. 7) comprises a plurality of knuckles 160, each of which is configured to receive a pin 153. The lid 150 and, hence, all pins 153 can be moved to insert the pins 153 in a respective knuckle 160 simultaneously, which is schematically illustrated in FIG. 7 by corresponding arrows. On the right-hand side in FIG. 7 the lid 150 has been moved towards the left, so that all pins 153 are fully inserted into the knuckles 160.

In the detail of FIG. 7, an optional holding mechanism of the pin 153 is illustrated. For instance, the pin 153 may include a latch-like protrusion 154, which can mate with an opening 163 in the knuckle 160. Thus, once the lid 150 and the pins 153 have been moved (to the left in FIG. 7), the protrusions 154 of the pins 153 may snap or latch into the opening 163 of the knuckle 160, so that the lid 150 is affixed to the hull 110 with rotational freedom. It is to be understood that the opening 163 may extend in a circumferential direction of the knuckle 160, in order to allow the protrusion 154 to rotate in the knuckle 160, when the lid 150 moves between the closed position and the fully open position. Such holding mechanism can be provided in one or more of the pins 153 and knuckles 160, or can be provided in all of the pins 153 and knuckles 160.

The free end of the pin 153 (e.g. including the protrusion 154) may point towards the front of the vehicle, in which such lid 150 and overhead stowage compartment is installed. This allows transferring the loads of the larger load cases, such as deceleration of the vehicle, to be transferred via the larger contact area between the bracket of pin 153 (to the right in FIG. 7) and the tubular opening in knuckle 160. The loads of the smaller load cases, such as acceleration of the vehicle and usual use of the lid, can be transferred via the contacting area between protrusion 154 and the side face of the opening 163.

Due to the large number of hinges 160, the forces to be transferred from the lid 150 into the hull 110 can be better distributed compared to conventional stowage compartments. Thus, the lid 150 can be made of a thinner and lighter material, as the major load case is holding back luggage and goods from leaving the stowage space. In addition, the large number of hinges 160 allows installation of the lid 150 in an arbitrary longitudinal position of the hull 110. The finer the grid or pattern of the hinges 160, the finer is the freedom of installation position of the lid 150 relative to the hull 110.

Figure 8:
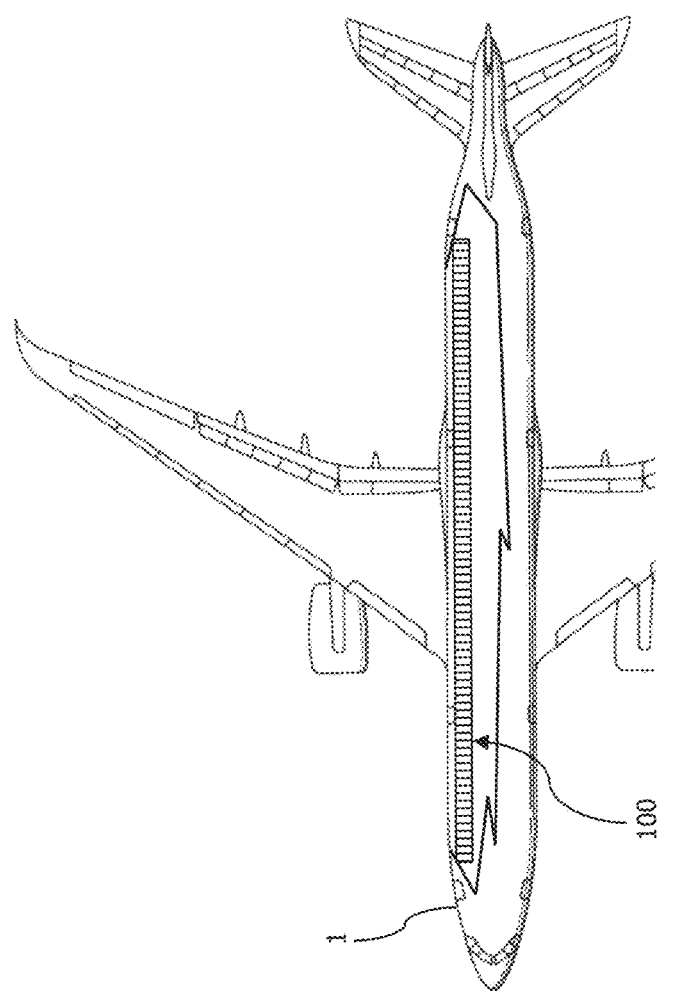
FIG. 8 schematically illustrates an aircraft with an overhead stowage compartment.

FIG. 8 schematically illustrates an aircraft 1, wherein an overhead stowage compartment 100 is installed. As illustrated in FIG. 8, the stowage compartment 100 can extend over an entire length of the passenger cabin of the aircraft 1. This is to be understood as one example of the disclosed stowage compartment 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A latch mechanism for a lid of an overhead stowage compartment, the latch mechanism comprising:

a plurality of locking members;

a plurality of latches, wherein each latch is configured to engage one of the locking members from the plurality of locking members, and a latch activation configured to engage or disengage the plurality of latches with the plurality of locking members, wherein the plurality of latches is configured to be mounted into a bottom of the overhead stowage compartment, wherein the plurality of locking members is associated with a single lid of the overhead stowage compartment, and wherein the latch activation translates a movement to each of the plurality of the plurality of latches in a common direction.

2. The latch mechanism according to claim 1, wherein the plurality of latches is configured to simultaneously engage or disengage the plurality of locking members.

3. The latch mechanism according to claim 1, wherein each of the locking members of the plurality of locking members comprises an eye configured to be coupled with one of the latches from the plurality of latches.

4. The latch mechanism according to claim 3, further comprising:

a latch lever coupled to the plurality of latches and configured to move each of the plurality of latches simultaneously.

5. The latch mechanism according to claim 4, wherein each latch includes a latch bolt configured to engage an eye of the one locking member.

6. The latch mechanism according to claim 1, wherein the plurality of latches includes an electromagnetic latch or an electrically driven latch.

7. The latch mechanism according to claim 1, further comprising:

a latch button coupled to the latch activation.

8. The latch mechanism according to claim 7, wherein, the latch button is configured to be mounted into the bottom and/or a bottom cover of the overhead stowage compartment.

9. The latch mechanism according to claim 1, wherein the latch activation comprises an electric motor or a pneumatic motor.

10. An overhead stowage compartment, comprising:

a bottom;

a lid; and the latch mechanism according to claim 1, wherein the plurality of latches of the latch mechanism is arranged in the bottom, and wherein the plurality of locking members is integrated or fastened to the lid.

11. The overhead stowage compartment according to claim 10, wherein one or more of the plurality of locking members arranged at a center of the lid have a respective eye of a first cross-sectional area, wherein one or more of the plurality of locking members arranged away from the center of the lid have a respective eye of a second cross-sectional area, and wherein the second cross-sectional area is larger than the first cross-sectional area.

12. The overhead stowage compartment according to claim 10, further comprising:

a pair of magnets, wherein a first magnet is mounted to the lid facing the bottom and a second magnet is mounted to the bottom facing the first magnet in the lid.

13. The overhead stowage compartment according to claim 10, further comprising:

a plurality of hinges configured to couple the lid to the overhead stowage compartment; or a piano hinge configured to couple the lid to the overhead stowage compartment; or both.

14. The overhead stowage compartment to claim 13, wherein the plurality of hinges or the piano hinge or the lid comprise one or more openings configured to allow smoke to escape from a stowage space of the overhead stowage compartment.

15. An aircraft comprising:

the overhead stowage compartment according to claim 10.

\* \* \* \* \*